Dec. 10, 1968    C. I. WILLIAMS    3,415,066
BEARING BRACKET FOR ROCK BOLTS
Filed Jan. 12, 1966
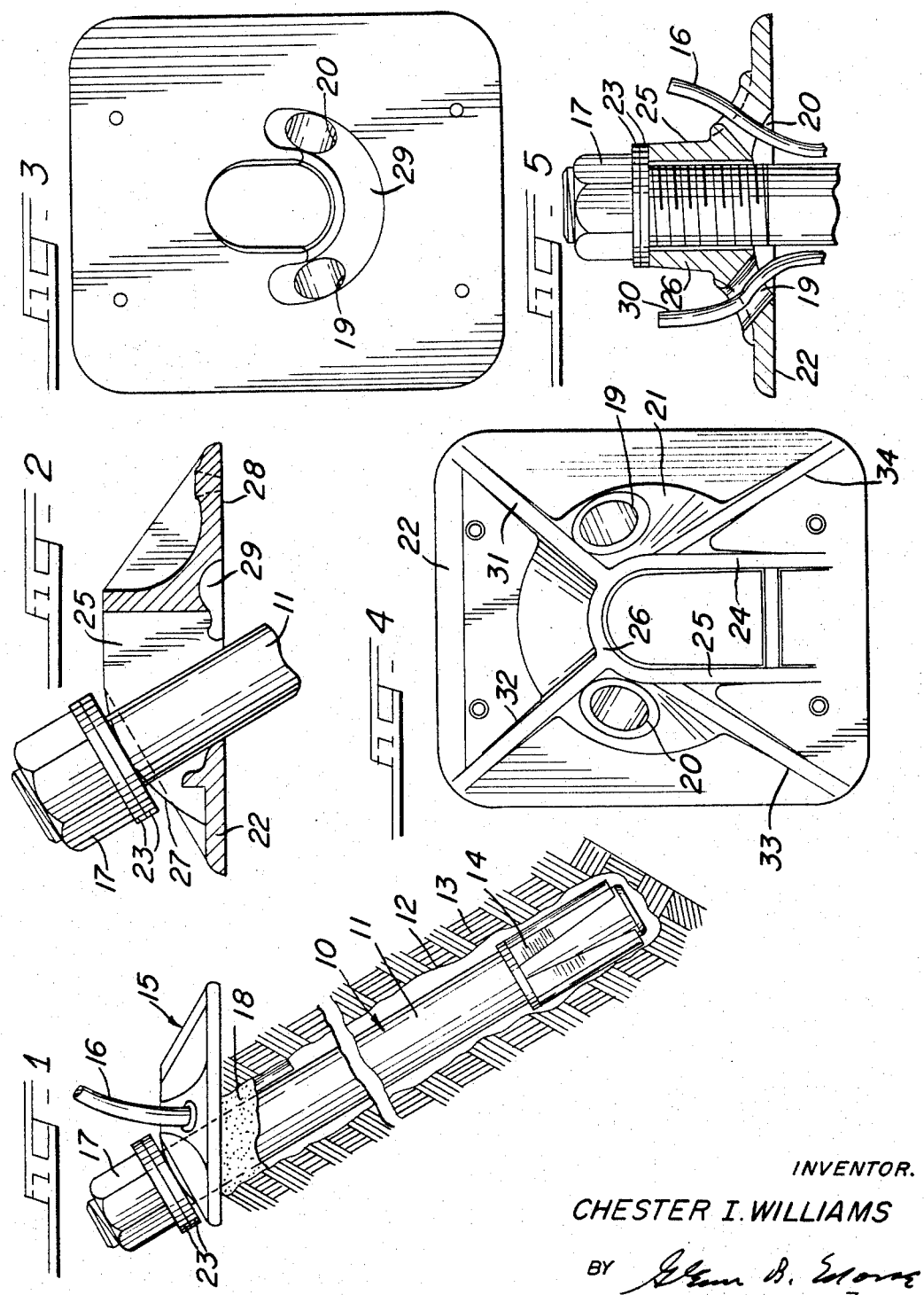
INVENTOR.
CHESTER I. WILLIAMS

United States Patent Office 3,415,066
Patented Dec. 10, 1968

3,415,066
BEARING BRACKET FOR ROCK BOLTS
Chester I. Williams, 347 Greenbriar SE.,
Grand Rapids, Mich. 49506
Filed Jan. 12, 1966, Ser. No. 520,135
4 Claims. (Cl. 61—45)

ABSTRACT OF THE DISCLOSURE

A bearing plate for rock bolts, having a peripheral bearing flange and central walls extending perpendicularly to the plane of the bearing flange to define an opening for receiving a bolt rod, a central structure defining a clearance space around the opening and provided with holes for the passage of grout tubes, and also having stiffening flanges uniting the walls, the central structure defining the clearance space, and the bearing flange for efficient transfer of stresses.

---

This invention relates to rock bolt installations, and provides a bearing device for transferring the bolt forces over to the surface of the rock formation. Rock bolts are commonly installed in holes drilled in the rock formation to a depth of 20 to 30 feet, and are usually provided with an anchor device at the inner extremity. In addition to being secured by the anchor device, rock bolts are commonly "grouted" by injecting a fluid cementitious mixture into the holes surrounding the bolt. The set grout acts as a protective sheath, as well as a stress transfer in shear from the bolt directly over to the rock along the hole. The rock bolt may be "pre-stressed" before the injection of the grout, so that the elongation of the bolt can take place without disrupting the bond between the grout and the bolt. These bolts are commonly from 3/4" to 1 1/2" in diameter, and are made from heavily cold-worked high tensile steel. An installed bolt will normally develop working loads representing a large portion of its ultimate strength, and any of these forces that are not transferred in shear through the grout must be taken out through the surface connection at a bearing bracket functioning in the general manner of a large washer.

Rock bolts are commonly installed at a considerable range of angular relationship between the axis of the bolt and the surface of a rock formation, which complicates the function of the bearing bracket. These brackets are commonly provided with a central opening between a pair of generally parallel walls having arcuate edges, so that the bolt can transfer its forces over to the bracket through a nut and washer which bridge across between the two spaced walls. This type of bearing bracket has presented problems where it has been necessary to work vent tubes out of the hole in the rock formation alongside the bolt, so that the air within the hole would have an escape passage as the grout was pumped in through either the hollow interior of the bolt, or through an auxiliary conduit installed alongside it. Particularly when the bolt has a considerable angle to a perpendicular to the surface of the rock formation, the presence of the heavy bearing bracket across the entrance of the hole has made it difficult to install the relatively light plastic vent tubes and assure that they can function without being squeezed off. In cases where substantial angular relationship of the bolt is present, there may also be a slight tendency for the bearing plate to shift laterally as bolt stresses are developed. This danger, of course, further complicates the installation of the vent tubes. Any attempt to work these relatively fragile tubes out through the same opening as that occupied by the bolt is a questionable procedure, since a tendency for the bolt to shift with respect to the plate, or for the plate to shift with respect to the ground, is likely to pinch off the vent tube.

Applicant has devised a bearing bracket that makes it possible to install vent tubes with hardly a second thought being given to protecting them from the bracket and from the rock bolt. It is common practice to pack a quantity of deformable mastic into the opening around the bolt, or to utilize a cork-like stopper for this same purpose. The vent tube is worked through either the mastic or through an opening provided in the stopper, and a grout-supply tube may be installed in the same manner for use in cases where the rock bolt is not hollow. The present invention provides a clearance area in the central portion of the underside of the bracket for receiving the ends of the vent tube (and also the grout-supply tube, where it is used), and for isolating it sufficiently from the bolt to prevent damage. An access port in the central area of the bracket is also provided where the tubes can be worked through the bracket in isolation from the bolt. The portions of the tube or tubes emerging from the seal at the mouth of the bolt hole may be worked through these access ports as the bearing bracket is installed. The clearance area permits the tubes to take their natural position underneath the bearing plate, and the tightening of the bolt will not produce a serious enough displacement to interfere with the continued functioning of the tubes.

The several features of the invention will be analyzed in further detail through a discussion of the particular embodiments illustrated in the accompanying drawing. In the drawing:

FIGURE 1 presents a sectional elevation showing an installed rock bolt.

FIGURE 2 is a sectional elevation on an enlarged scale of the bolt and the bracket alone.

FIGURE 3 is a bottom view of the bearing bracket.

FIGURE 4 is a top view of the bearing bracket.

FIGURE 5 is a sectional elevation showing the installed position of the vent and supply tubes in the bracket.

Referring to FIGURE 1, the rock bolt assembly generally indicated at 10 includes the rod 11 installed in the hole 12 in the rock formation 13. The anchor device 14 at the inner extremity of the rod 11 is of any convenient design, and has the principal function of expanding as the rock bolt is rotated from the surface to bear heavily against the wall of the hole 12 so that a substantial portion of the strength of the rod 11 can be developed between that point and the bearing bracket 15. After the rock bolt assembly has been "pre-stressed" by rotation of the nut 17 (following the setting of the anchor 14), the space between the wall 12 of the hole and surrounding the rock bolt assembly is pumped full of "grout." Where the rod 11 is hollow, it can also function as a conduit for conducting the grout into the anterior portion of the hole, with the air being withdrawn through the flexible vent tube 16 as the grout progressively fills the hole. Where the rod 11 is solid, an auxiliary conduit is installed along with the bolt, and extends substantially over the full length of the rock bolt assembly 10.

In order that the pressure of the grout may be fully developed within the hole, it is the usual practice to apply a quantity of mastic as shown at 18. Alternatively, a stopper device may be shoved into position in this area, and in either case, the effect is to seal off the end of the hole so that adequate grout pressure can be developed to fully interengage the grout with the irregularities in the hole 12. The vent tube 16 (and a grout supply tube, where it is used) are worked through the mastic 18, and are also worked through either of the holes 19 or 20 in the central structure 21 which transfers the forces from the bolt over to the peripheral flange 22 which engages the surface of the rock formation. One or more washers as shown at 23 usually bridge across between the parallel walls 24 and 25 defining the opening 26 in the central structure of the bracket, with the washers 23 engaging the arcuate edges 27 to accommodate the rod 11 over a considerable range of angular relationship between the plane of the bearing surface 28 defined by the flange 22.

The central structure 21 defines a clearance space 29 at least partially surrounding the opening 26, with this clearance space being provided to permit the light flexible tubes 16 and 30 to seek their own position without interference. FIGURE 5 illustrates the manner in which the tubes are protected against lateral shifting of the bolt with respect to the bracket, or of the bracket with respect to the hole in the ground formation. It is preferable to include stiffening flanges as shown at 31–34, with these being in transverse relationships with respect to each other. The ports 19 and 20 are disposed in the central structure 21 in the sector between the flanges 31–34 and 32–33. With these ports communicating between the interior clearance space 29 and the exterior of the bracket, the stressing of the bolt can be carried out without interference with the vent and supply tubes, and without requiring extensive care in the installation of the rock bolt assembly.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A bearing device for transferring forces from a rock bolt to the surface of a ground formation engaged by said rock bolt, said device comprising:
   a peripheral flange providing a bearing surface for engaging a ground formation,
   a central transfer structure fixed with respect to said flange and defining a central opening for receiving the end of a rock bolt, said structure including substantially parallel walls on opposite sides of said opening and generally perpendicular to said peripheral flange, the edges of said walls being arcuate for receiving securing means engaging a bolt over a range of angular positions of said bolt with respect to said flange,
   said structure defining a clearance space, spaced from the plane of said bearing surface and at least partially surrounding said opening, and
   said structure having at least one port communicating between said clearance space and the exterior of said device, and
   stiffening flanges substantially perpendicular to said bearing flange, and integral therewith and with said walls and the portion of said central structure defining said clearance space.

2. A device as defined in claim 1, wherein said walls extend exclusively to one side of said opening, and said clearance space is disposed on the opposite side of said opening.

3. A device as defined in claim 1, wherein said device has a pair of ports, one disposed on each side of the space defined by said walls.

4. A device as defined in claim 1, wherein said device is provided with stiffening flanges interconnecting said transfer structure and said peripheral flange, and said port is disposed in a sector between two of said stiffening flanges.

References Cited

UNITED STATES PATENTS

| | | | |
|---|---|---|---|
| 1,148,491 | 7/1915 | Hall | 85—50 |
| 1,854,277 | 4/1932 | Schotz | 85—50 |
| 1,995,206 | 3/1935 | Geissbuhler. | |
| 2,014,419 | 9/1935 | Voigt. | |
| 2,682,152 | 6/1954 | Bierer. | |
| 3,222,873 | 12/1965 | Williams. | |
| 3,238,731 | 3/1966 | Seifert et al. | |

FOREIGN PATENTS 1,085,480   7/1960   Germany.

DAVID J. WILLIAMOWSKY, *Primary Examiner.*

DENNIS L. TAYLOR, *Assistant Examiner.*